Figure 1:
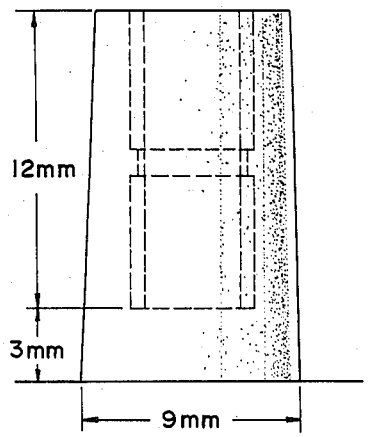

United States Patent [19]

Kasahara et al.

[11] 4,369,278

[45] Jan. 18, 1983

[54] RESIN COMPOSITION FOR INJECTION MOLDING AND METHOD FOR PRODUCING THE SAME

[75] Inventors: Hideo Kasahara, Yokohama; Kunio Fukuda, Chigasaki; Yukihisa Mizutani, Kawasaki, all of Japan

[73] Assignee: Asahi-Dow Limited, Tokyo, Japan

[21] Appl. No.: 298,807

[22] Filed: Sep. 2, 1981

[30] Foreign Application Priority Data

Sep. 16, 1980 [JP] Japan ................................ 55/127119

[51] Int. Cl.³ .............................................. C08K 5/51
[52] U.S. Cl. ..................................... 524/147; 264/101; 264/102; 264/328.6; 264/331.13; 524/151; 524/291; 524/349; 524/350; 524/351; 524/352; 525/68; 525/139; 525/392; 525/905
[58] Field of Search ................. 260/45.7 PH, 45.95 F, 260/45.95 G, 45.95 H, 45.95 J; 525/68, 139, 905; 264/101, 102, 328.6, 331.13; 524/147, 151, 291, 349, 350, 351, 352

[56] References Cited

U.S. PATENT DOCUMENTS

| | | | |
|---|---|---|---|
| 3,700,750 | 10/1972 | Yamanouchi et al. | 260/45.7 P |
| 3,883,613 | 5/1975 | Cooper | 260/45.7 P |
| 3,929,930 | 12/1975 | Izawa et al. | 525/68 |
| 4,097,556 | 6/1978 | Toyama et al. | 525/68 |

*Primary Examiner*—J. Ziegler
*Attorney, Agent, or Firm*—Armstrong, Nikaido, Marmelstein & Kubovcik

[57] ABSTRACT

A resin composition suitable for injection moulding and having excellent heat resistance, impact resistance and crack resistance, which is composed of polyphenylene ether and rubber-reinforced styrene resin and an amount of volatile matters in the resin having molecular weight of about 300 or less is 5000 ppm or less. This resin composition is prepared by melting and kneading the two resins above in an extruder with a vent under keeping the vent part under reduced pressure.

9 Claims, 4 Drawing Figures

RESIN COMPOSITION FOR INJECTION MOLDING AND METHOD FOR PRODUCING THE SAME

The present invention relates to a resin composition for injection molding, excelling in heat resistance, impact resistance and crack resistance, which is composed of polyphenylene ether and rubber-reinforced styrene polymer and a method for preparing the same.

The polyphenylene ether excels in mechanical properties, electrical properties, and heat resistance, and is low in water absorbability and has good dimentional stability. Because of these excellent properties, it is highly noticed of late. However, the polyphenylene ether alone is generally inferior in processability and impact resistance, so that its industrial applications are considerably limited. In order to compensate for such defects, resin compositions composed of polyphenylene ether and styrene polymer were proposed in Japanese Examined Patent Publication No. 17812/1968 and U.S. Pat. No. 3,838,435, and they are widely used industrially, and injection molding is mainly used as the processing method. However, since cracks are often caused in positions of molded articles where strong residual strain is considered to remain locally, such as sharp corners at the fluidizing end of moldings and metal inserted parts when injection-molding said resin compositions, the molding conditions and designing of moldings have been restricted.

The present inventors made intensive researches to find resin compositions not causing such cracks and excelling in crack resistance in injection moldings, and learned a completely novel knowledge that there is a correlation between the content of volatile substance in the resin composition and the crack initiation, and thereby achieved this invention.

Figure 2:
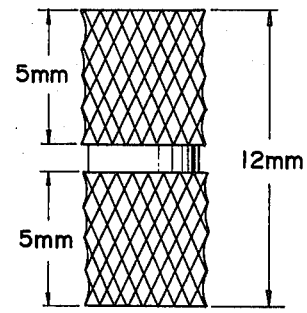
Figure 3:
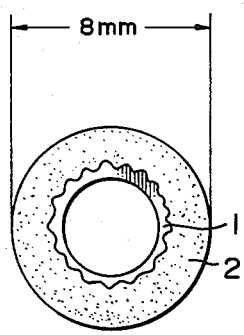
Figure 4:
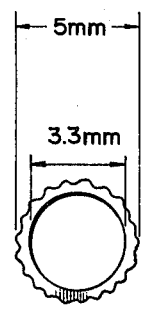

In the accompanying drawings,

FIG. 1 is an elevational view of an injection moulded article in a box shape having a metal boss inserted in a resin body in order to test whether cracks are formed around the metal, FIG. 2 is an elevational view of the metal boss, FIG. 3 is an end view of the moulded article, and FIG. 4 is an enlarged detail of the metal boss inserted.

According to this invention, a resin composition composed of polyphenylene ether and a rubber-reinforced styrene polymer, and a method for producing the same are provided. More particularly, this is to provide a resin composition for injection molding, excelling in crack resistance, containing volatile substances of which molecular weight is about 300 or less by not more than 5000 ppm, or more preferably by not more than 3000 ppm, and a method for producing the same.

The volatile substances contained in the resin composition of the present invention may be polymerization solvents, residual monomers and oligomers contained in polyphenylene ether, residual monomers, oligomers and polymerization solvents contained in rubber-reinforced styrene polymer, and volatile substances produced when manufacturing the resin composition of the present invention, especially as the result of pyrolysis of styrene polymer. The volatile substances of the present invention are those having molecular weight of about 300 or less. Specifically, such volatile substances may be styrene monomer, ethylbenzene, toluene, xylene, tetrahydrofuran, pyridine, styrene dimer, styrene trimer and the like. Among them, the volatile substances most likely to remain in the resin composition of this invention may be styrene monomer, styrene dimer, styrene trimer, ethylbenzene, toluene and xylene.

The volatile substances referred to above may be measured by gas chromatography (detector FID), by using a solution of resin composition dissolved in chloroform. Styrene monomer, xylene, ethylbenzene and the like may be measured at 115° C. by using PEG-20M 25% as the column filler, and styrene dimer and styrene trimer, at 190° C. and 260° C., respectively, using silicon OV-17 3% as the column filler. By totaling the components during the holding time before styrene trimer, the amount of the volatile substances contained in the resin composition are determined.

The melting and kneading conditions of polyphenylene ether and rubber-reinforced styrene polymer should be higher in temperature and stronger in shearing force than those in kneading rubber-reinforced styrene polymer alone, in order to have the remaining volatile substances controlled in the resin composition.

The polypenylene ether referred to in this invention is a polymer having the following repeating structural unit I or units I and II:

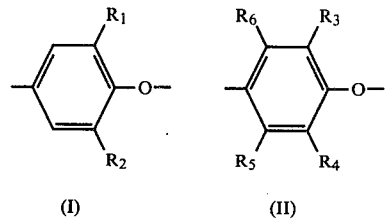

wherein $R_1$–$R_6$ are same or different univalent residual groups such as alkyl group having 1–4 carbon atoms excluding tert.-butyl, aryl group, halogen and hydrogen but $R_5$ and $R_6$ are not hydrogen at the same time. The polymer can be obtained by allowing phenol to react with oxygen in the presence of a complex of copper or manganese. Specific examples are poly (2,6-dimethyl-1,4-phenylene) ether, poly (2,6-diethyl-1,4-phenylene) ether, poly (2,6-dichlor-1,4-phenylene) ether, poly (2,6-dibrom-1,4-phenylene) ether, poly (2-methyl-6-ethyl-1,4-phenylene) ether, poly (2-chlor-6-methyl-1,4-phenylene) ether, poly (2-methyl-6-isopropyl-1,4-phenylene) ether, poly (2,6-di-n-propyl-1,4-phenylene) ether, poly (2-chlor-6-brom-1,4-phenylene) ether, poly (2-chlor-6-ethyl-1,4-phenylene) ether, poly (2-methyl-1,4-phenylene) ether, poly (2-chlor-1,4-phenylene)ether, poly (2-phenyl-1,4-phenylene) ether, poly (2-methyl-6-phenyl-1,4-phenylene) ether, poly (2-brom-6-phenyl-1,4-phenylene) ether and copolymer of 2,6-di-methyl phenol and 2,3,6-trimethyl phenol.

Molecular weight of the polyphenylene ether is preferably within the range from 0.50 to 0.80 in terms of $\eta sp/c$ observed in a chloroform solution at 25° C.

Alternatively, styrene alone or comonomers polymerizable with styrene may be grafted to the polyphenylene ether. The comonomers are, for example, α-methylstyrene, methylstrene, dimethylstyrene, vinyltoluene, acrylonitrile, methacrylonitrile, acrylic acid, methacrylic acid and esters of methacrylic acid. The grafting may be carried out by any methods such as those disclosed in Japanese Examined Patent Publication No. 30991/1977, U.S. Pat. Nos. 3,929,930 and 4,097,556, for example, grafting under heating styrene alone or the comonomers above on polyphenylene ether in the presence of peroxides.

The rubber-reinforced styrene polymer referred to in this invention contains rubber-like polymer, reinforcing component, dispersed in the island form in the styrene polymer. The polymer can be prepared by polymerizing monomers mainly composed of a styrene compound in the presence of rubber-like polymer, in bulk polymerization, solution polymerization, bulk suspension polymerization, or emulsion polymerization. As the rubber-like polymer, polybutadiene, styrene-butadiene rubber, ethylene-propyrene rubber, or polyacrylate ester may be used. Meanwhile, the rubber-reinforced styrene polymer used in this invention is preferably low in content of volatile substances, such as styrene monomer, styrene dimer, and styrene trimer.

The resin composition of the present invention is preferably composed of 20 to 80 wt.% of polyphenylene ether, and 80 to 20 wt.% of rubber-reinforced styrene polymer. When the content of polyphenylene ether is too high, styrene monomer, styrene dimer, and styrene trimer are easily produced as the result of pyrolysis of styrene polymer, since the resin undergoes a heat history of high temperature, more than 300° C., in the step of producing the resin composition of the present invention or in the step of molding. On the other hand, when the content of polyphenylene ether is too low, the heat resistance of the resin composition is lowered.

A preferable method of producing resin compositions of the present invention is a process of removing volatile substances when melting and kneading the polyphenylene ether and rubber-reinforced styrene polymer. Specifically, it is a method of removing volatile substances by keeping a vent part in reduced pressure in an extruder with the vent. More preferably, an extruder having two or three vents is used. Furthermore, in order to hold down formation of styrene monomer, styrene dimer, and styrene trimer due to pyrolysis of rubber-reinforced styrene polymer when melting and kneading, it is preferable to use pyrolysis inhibitors such as hindered phenol compounds, including 2,6-di-tertiary-butyl-4-hydroxytoluene, octadecyl-3-(3,5-di-tertiary-butyl-4-hydroxphenyl) propionate, and phosphite compounds including trinonylphenyl phosphite. In this case, the content of pyrolysis inhibitor is preferably 0.05 to 5 parts by weight each 100 parts by weight of the resin.

It has been also found that addition of a slight amount of water when melting and kneading the polyphenylene ether and rubber-reinforced styrene polymer, has a remarkable effect in efficient removal of the volatile substances. As the result of addition of water, the volatile substances are more easily evaporated, and local excess heating of the resin may be restricted when melting and kneading, so that pyrolysis of styrene polymer may be discouraged, in particular. The content of water is 0.1 to 15 parts by weight, preferably 0.5 to 10 parts by weight, each 100 parts by weight of the resin. Too much or too less water may reduce the removing effect of volatile substances. The water may be blended with the resin pellets before feeding to an extruder, or may be charged under pressure into the intermediate positions between the feed part and the vent part of the cylinder of the extruder.

A resin composition containing not more than 5000 ppm, preferably not more than 3000 ppm of volatile substances whose molecular weight is about 300 or less can be obtained by conducting the melting and kneading in such a manner that volatile substances such as polymer solvent contained in the polyphenylene ether and styrene monomer, styrene dimer, styrene trimer, and polymerization solvent contained in the rubber-reinforced styrene polymer are eliminated and, at the same time, pyrolysis of rubber-reinforced styrene polymer is held down or the volatile substances such as styrene monomer, styrene dimer and styrene trimer produced as the result of pyrolysis are removed.

Flame retardants or plasticizers may be added to the resin composition of the present invention. As such flame retardants or plasticizers, any of those well known may be used, such as phosphorus compound including triphenyl phosphate, and halogen compound including decarbromodiphenyl oxide. Other additives, such as colorants and stabilizer, may be contained in the resin composition. Or, other polymers, such as polyethylene, polypropyrene, polyamide, and polyester, may be mixed in, only to an extent that characteristics such mechanical properties may not be spoiled. The content of such additive resins may be 20 wt.% or less.

Also, a reinforcing filler may be contained in the resin composition of the present invention. Materials usable as reinforcing filler may include glass fiber, carbon fiber, asbestos, wollastonite, calcium carbonate, talc, mica, zinc oxide, titanium oxide, and potassium titanate. The content of such fillers may be within the range of 1 to 50 wt.% of the entire composition.

Below is described the present invention by referring to the examples, but the invention is not limited by these embodiments alone. In the following paragraphs, the unit of "parts" refers to "parts by weight."

EXAMPLE 1

Exactly 50 parts of poly (2,6-dimethyl-1,4-phenylene) ether [$\eta sp/c = 0.55$, as measured in chlorform solution at 30° C.], 50 parts of Styron 492 (rubber-reinforced polystyrene, manufactured by Asahi-Dow Ltd.), and 1 part of Irganox 1076 [octadecyl-3-(3,5-ditertiary-butyl-4-hydroxyphenyl) propionate, manufactured by Ciba-Geigy] were blended in a blender, and the mixture was melted and kneaded in a twin extruder with vents at 280° C. to obtain pelletized resin composition.

When melting and kneading, 2 parts of water, with respect to 100 parts of the resin, was press-fed between the feed part and the vent part of the extruder, and the extruder was operated while keeping the vent parts under reduced pressure state (−720 mmHg). The amount of volatile substances in the resin composition thus obtained was measured by gas chromatography (detector FID). Components such as styrene monomer, ethylbenzene and xylene were determined at 115° C. by using column filler PEG-20M 25% (carrier: Chromosolve W; column length: 3 m), while styrene dimer and styrene trimer were determined at 190° C. and 260° C., respectively, by using column filler silicon OV-17 3% (carrier: Chromosolve W; column length: 3 m). Totaling the components having the holding time before styrene trimer, the content of volatile substances in the resin composition was determined.

Besides, dumbbell specimens of ⅛-inch thickness were injection molded from the resin composition at 290° C. After storing the specimens for 50 days after injection molded in a thermostatic room controlled at 23° C. and 50% RH, cracks caused in the tip of dumbbell specimens were observed. The results are shown in Table 1.

EXAMPLE 2

A mixture of 50 parts of the same poly (2,6-dimethyl-1,4-phenylene) ether as in Example 1, 50 parts of Styron 492, 1 part of Irganox 1076, and additionally 0.2 parts of trinonylphenyl phosphite, was melted and kneaded at 280° C. by using a twin extruder with vents to obtain pelletized resin composition. When melting and kneading, the extruder was operated while keeping the vent part under reduced pressure state (−700 mmHg). (Water was not added in this case.)

The same tests as in Example 1 were performed, and the results are shown in Table 1.

COMPARATIVE EXAMPLE 1

A mixture of 50 parts of the same poly-(2,6-dimethyl-1,4-phenylene) ether as in Example 1 and 50 parts of Styron 492, was melted and kneaded at 280° C. by using a twin extruder with a blocked vent part to obtain pelletized resin composition.

The same tests as in Example 1 were performed, and the results are shown in Table 1.

TABLE 1

Performance of Resin Composition

|  | Example 1 | Example 2 | Comparative Example 1 |
|---|---|---|---|
| Content of volatile substance in the resin composition | 2500 ppm | 3200 ppm | 7500 ppm |
| Crack initiation in injection-molded specimens | No crack | No crack | Cracked |

EXAMPLE 3

Example 1 was repeated using 50 parts of a copolymer composed of 90 mol% of 2,6-dimethyl phenol and 10 mol% of 2,3,6-trimethyl phenol [$\eta sp/c=0.54$], 50 parts of Styron 492 and one part of Irganox 1076, to produce a resin whose content of volatile substances was 2600 ppm. No crack could be seen in dumbbell specimens prepared by injection molding.

EXAMPLE 4

A resin in pellet form was prepared by blending 50 parts of the same poly (2,6-dimethyl-1,4-phenylene) ether as in Example 1, 50 parts of Styron 492, one part of Irganox 1076 and 3 parts of triphenyl phosphate (molecular weight=326) and melting and kneading in a twin extruder with a vent at 280° C., while keeping the vent part under reduced pressure (−740 mmHg).

The same tests as of Example 1 were effected to find 4000 ppm of volatile substance content and 2.2% by weight of triphenyl phosphate in the resin composition. No crack could be observed in dumbbell specimens prepared by injection molding.

COMPARATIVE EXAMPLE 2

A resin in pellet form was prepared by blending 50 parts of the same poly (2,6-dimethyl-1,4-phenylene) ether as in Example 1, 50 parts of Styron 492, one art of Irganox 1076 and 2 parts of the volatile substances recovered from the vent part of the extruder in Example 1 and melting and kneading in a twin extruder with a vent at 280° C., while keeping the vent part under reduced pressure (−740 mmHg).

The same tests as in Example 1 were carried out to find 6500 ppm of volatile substances. Slight cracks were observed in dumbbell specimens injection molded.

Furthermore, shaped articles as shown in the drawings in the box form (128 mm long×128 mm wide×60 mm high×2.5 mm thick) having a brass boss inserted 1 in resin body 2 were prepared by injection molding the resins prepared in Example 1 and comparative example 1, respectively, under conditions, i.e. cylinder temperature: 290° C., a mold temperature: 80° C.

Observation was made at the metal inserted boss under microscope whether or not cracks occur when three months elapsed after molding. No crack was found in the box prepared from example 1 resin but cracks around the metal appeared in the box prepared from comparative example 1.

We claim:

1. A resin composition for injection molding, which is composed of 20 to 80 wt.% of a polyphenylene ether and 80 to 20 wt.% of a rubber-reinforced styrene polymer and contains not more than 5000 ppm of volatile substances of which molecular weight is about 300 or less.

2. A resin composition according to claim 1 wherein the volatile substances of which molecular weight is about 300 or less includes styrene monomer, styrene dimer, styrene trimer, toluene, xylene, ethylbenzene, pyridine and the like.

3. A resin composition according to claim 1, wherein polyphenylene ether has 0.50–0.80 of $\eta sp/c$.

4. A method for producing a resin composition, containing not more than 5000 ppm of volatile substances of which molecular weight is about 300 or less, which comprises melting and kneading a polyphenylene ether and a rubber-reinforced styrene polymer in the presence of a pyrolysis inhibitor in an extruder with a vent, and keeping the vent part under reduced pressure.

5. A method for producing resin composition according to claim 4 wherein water is added by 0.1 to 15 parts by weight each 100 parts by weight of the resin, when melting and kneading the polyphenylene ether and the rubber-reinforced styrene polymer are carried out.

6. A method for producing resin composition according to claim 4 wherein the pyrolysis inhibitor is at least one selected from hindered phenol compounds and phosphite compounds, and its charge amount is 0.05 to 5 parts by weight each 100 parts by weight of the resin.

7. A method according to claim 4 wherein the polyphenylene ether has 0.50–0.80 of $\eta sp/c$.

8. A resin composition for injection molding comprising 20 to 80 wt.% of a polyphenylene ether and 80 to 20 wt.% of a rubber-reinforced styrene polymer and comprising not more than 5,000 ppm of volatile substances having a molecular weight of about 300 or less, the resin composition being prepared by melting and kneading a polyphenylene ether and a rubber-reinforced styrene polymer in the presence of a pyrolysis inhibitor in an extruder with a vent, while keeping the vent part under reduced pressure.

9. A resin composition according to claim 8 wherein water is added by 0.1 to 15 parts by weight each 100 parts by weight of the resin, when melting and kneading the polyphenylene ether and the rubber-reinforced styrene polymer are carried out.

* * * * *